United States Patent
Summerland et al.

(10) Patent No.: US 8,242,711 B2
(45) Date of Patent: Aug. 14, 2012

(54) LIGHTING SYSTEMS

(75) Inventors: David Thomas Summerland, Leicestershire (GB); Charles Pollock, Rutland (GB); Helen Pollock, Rutland (GB)

(73) Assignee: Hold IP Limited, Prospect Hill (IM)

( * ) Notice: Subject to any disclaimer, the term of this patent is extended or adjusted under 35 U.S.C. 154(b) by 105 days.

(21) Appl. No.: 12/450,568

(22) PCT Filed: Mar. 31, 2008

(86) PCT No.: PCT/GB2008/050231
§ 371 (c)(1),
(2), (4) Date: Sep. 29, 2009

(87) PCT Pub. No.: WO2008/120019
PCT Pub. Date: Oct. 9, 2008

(65) Prior Publication Data
US 2010/0141169 A1    Jun. 10, 2010

(30) Foreign Application Priority Data

Mar. 30, 2007  (GB) .................................. 0706152.6
May 31, 2007  (GB) .................................. 0710291.6

(51) Int. Cl.
*G05F 1/00*  (2006.01)
*H05B 37/02*  (2006.01)
(52) U.S. Cl. ...................... 315/307; 315/291
(58) Field of Classification Search .................. 315/177, 315/178, 185 R, 200 R, 209 R, 246, 247, 315/291, 307, 308, 312
See application file for complete search history.

(56) References Cited

U.S. PATENT DOCUMENTS

| 5,121,287 A | 6/1992 | Lee |
| 5,430,356 A | 7/1995 | Ference et al. |
| 5,463,286 A | 10/1995 | Daleo et al. |

(Continued)

FOREIGN PATENT DOCUMENTS

EP    0567280    10/1993

(Continued)

OTHER PUBLICATIONS

Flower and Pollock (1997) "SeriesProperties and design of series-parallel load-resonant converters: their potential in marine and marine-related applications," *Transactions on Image Processing*, 110(2): 95-118.

(Continued)

*Primary Examiner* — Douglas W Owens
*Assistant Examiner* — Minh D A
(74) *Attorney, Agent, or Firm* — Quine Intellectual Property Law Group, P.C.

(57) ABSTRACT

A power adaptor (20) for a lighting unit (50) having a solid state light source (50a,50b,50c) is disclosed. The power adaptor (20) comprises an input (22) for connection to a mains power supply, a power transfer module (40a,40b,40c,140a) that is coupled to the input (22) and provides an output suitable for driving the solid state light source (50a,50b,50c), and a controller (30) that receives a voltage signal from the input (22) and is able to deliver a control signal to the power transfer module (40a,40b,40c,140a) for reducing the power drawn from the input (22). The power adaptor (20) draws current from the input (22) as a function of the voltage at the input (22) in order that the power adaptor (20) appears as a variable resistor to the mains supply.

14 Claims, 4 Drawing Sheets

U.S. PATENT DOCUMENTS

| | | | |
|---|---|---|---|
| 2,661,645 A | 8/1997 | Hochstein | |
| 5,783,909 A | 7/1998 | Hochstein | |
| 6,011,362 A * | 1/2000 | Moisin | 315/307 |
| 6,028,776 A * | 2/2000 | Ji et al. | 363/21.05 |
| 6,093,983 A | 7/2000 | Singh | |
| 6,118,231 A | 9/2000 | Geiginger et al. | |
| 6,181,082 B1 * | 1/2001 | Moisin | 315/291 |
| 6,300,727 B1 | 10/2001 | Bryde et al. | |
| 6,545,434 B2 | 4/2003 | Sembhi et al. | |
| 6,842,668 B2 | 1/2005 | Carson et al. | |
| 6,927,546 B2 | 8/2005 | Adamson et al. | |
| 6,933,686 B1 | 8/2005 | Bishel | |
| 6,954,038 B2 * | 10/2005 | Ido et al. | 315/291 |
| 7,038,399 B2 | 5/2006 | Lys et al. | |
| 7,110,269 B2 * | 9/2006 | Cao et al. | 363/21.03 |
| 7,119,494 B2 * | 10/2006 | Hui et al. | 315/219 |
| 7,312,695 B2 | 12/2007 | Lehmer et al. | |
| 7,646,029 B2 * | 1/2010 | Mueller et al. | 257/84 |
| 2001/0022501 A1 | 9/2001 | Pilz et al. | |
| 2004/0085030 A1 | 5/2004 | Laflamme et al. | |
| 2004/0264187 A1 | 12/2004 | Vanderschuit et al. | |
| 2005/0231133 A1 | 10/2005 | Lys | |
| 2006/0002110 A1 | 1/2006 | Dowling et al. | |
| 2006/0238136 A1 | 10/2006 | Johnson, III et al. | |

FOREIGN PATENT DOCUMENTS

| | | |
|---|---|---|
| EP | 0574993 | 12/1993 |
| EP | 0889673 | 1/1999 |
| EP | 1528785 | 5/2005 |
| EP | 2079278 | 7/2009 |
| GB | 2184566 | 6/1987 |
| JP | 200780771 | 3/2007 |
| JP | 2007035403 | 3/2007 |
| WO | WO 99/45750 | 9/1999 |
| WO | WO 01/82657 | 11/2001 |
| WO | WO 03/079738 | 9/2003 |
| WO | WO 03/096761 | 11/2003 |
| WO | WO 2006/038157 | 4/2006 |
| WO | WO 2006/060900 | 6/2006 |
| WO | WO 2006/102355 | 9/2006 |
| WO | WO 2008/120019 | 10/2008 |

OTHER PUBLICATIONS

Pollock and Flower (1996) "Series-parallel load-resonant converter for controlled-current arc welding power supply." *IEE Proceedings—Electric Power Applications*, 143(3): 211-218.

Pollock and Flower (1997) "New Method of Power Control for Series-Parallel Load-Resonant Converters Maintaining Zero-Current Switching and Unity Power Factor Operation." *IEEE Transactions on Power electronics*, 12(1): 103-115.

Pollock and Miti (1995) "Isolated step up/down three-phase AC to DC power supply." *Electronic Letters*, 31(18): 1527-1529.

Pollock et al. (1997) "Load-resonant converter with zero current switching and variable output power." *Electronic Letters*, 33(25): 2081-2082.

Polock(1999) "Comstant frequence, constant current load-resonant capacitor charging power supply." IEE Proceedings, 187-192.

\* cited by examiner

LIGHTING SYSTEMS

This application is a 35 U.S.C. §371 national phase filing of PCT application PCT/GB2008/050231, filed Mar. 31, 2008, which PCT application claims priority to GB 0706152.6 filed Mar. 30, 2007 and GB 0710291.6 filed May 31, 2007.

This invention relates to lighting systems, and in particular to power adaptors for solid state light sources.

Recently, solid state light sources, such as light emitting diodes (LEDs), have been incorporated into conventional lighting systems, particularly those found in domestic settings. LEDs are current-driven devices whose brightness is substantially proportional to their forward current. Conventionally, therefore, a solid state light source would be driven by a power adaptor that regulates the current through the light source, and adjusts the current in order to control the intensity of the light output, typically using Pulse Width Modulation (PWM). In particular, solid state lighting units including a plurality of solid state light sources have become popular in domestic settings for providing so-called 'mood' lighting, as described in WO 2006/018604. By providing three different colours of light emitting diodes (typically red, green and blue), the overall colour of the light output of the LED lighting units may be varied by independently varying the intensity of light output from each of the different colour groups.

A conventional method of regulating LED current is to drive the LED with a constant-current power supply. In particular, a constant-current power supply typically regulates the voltage across a current-sense resistor, such that the constant current driving the LED is determined by a reference voltage of the power supply and the value of the current-sense resistor. However, LEDs typically have a forward potential difference that varies between devices within a tolerance range due to temperature and manufacturing variations. A disadvantage of using a constant-current power supply is therefore that the total power and hence intensity of the light output of different LEDs is likely to be different. This can lead to non-uniform light output between lighting units.

In WO 2006/018604, a number of arrangements of power adaptors and dimming controllers are described for lighting systems having both incandescent and solid state lighting units. These existing power adaptors are able to control the intensity of the light output and/or a colour characteristic of a solid state lighting unit by producing driving signals for the LEDs using conventional pulse width modulation (PWM), or using a squared power law saw tooth technique as described in WO 2007/026170, such that changes in the duty cycle (or on-duration) of the LED drive current give rise to corresponding changes in the amount of average current made available to the LEDs via the power adaptor. This current regulation stage is normally a processor controlled closed loop that is fed by a switch mode power supply to lower the voltage of the mains supply. However, such power adaptors can cause harmonic currents to be drawn from the mains supply, which may contravene IEC standards that impose limits on the amplitude of a range of current harmonics that may be drawn from the mains supply.

There has now been devised an improved power adaptor which overcomes or substantially mitigates the above-mentioned and/or other disadvantages associated with the prior art.

According to a first aspect of the invention, there is provided a power adaptor for a lighting unit having a solid state light source, the power adaptor comprising an input for connection to a mains power supply, a power transfer module that is coupled to the input and provides an output suitable for driving the solid state light source, and a controller able to deliver a control signal to the power transfer module, wherein the power transfer module includes an LCL series-parallel resonant circuit, and the power-adaptor draws current from the input as a function of the voltage at the input, such that the intensity of light output from the solid state light source is controllable by an external power reducing device.

The power adaptor according to the invention is advantageous principally because the power adaptor and the connected solid state light source would appear like a variable resistor to the mains power supply, and hence the solid state light source would act like a conventional filament light bulb. The intensity of light output from the solid state light source can therefore be controlled by an external power reducing device. Alternatively, the intensity of light output from the solid state light source can be controlled by a combination of an external power reducing device, and the internal controller that is able to reduce the power drawn from the input of the power adaptor. For example, the internal controller may be adapted to cause a reduction of the power drawn from the input of the power adaptor when a maximum amount of power is available, and then lessen that reduction as the amount of power available falls, thereby causing the solid state light source to follow a non-linear dimming curve.

A further advantage of the power adaptor according to the invention is that the solid state light source, which is typically a Light Emitting Diode (LED), may be provided with a pre-determined average power in order to achieve a desired intensity of light output. The power adaptor therefore enables a particular intensity of light output to be achieved, regardless of the forward potential difference of the LED. Most preferably, the average power provided to the LED is substantially equal to the average power drawn at the input of the power adaptor. The power adaptor and connected LED would therefore act like a conventional tungsten bulb when connected to a power reducing device, in that the intensity of its light output would inherently reduce as the power drawn from the input reduces, and hence the power adaptor does not regulate a constant output to the LED.

The power adaptor draws current from the input as a function of the voltage at the input in order that the power adaptor appears as a variable resistor to the mains supply. This is preferably achieved by: (i) minimising the capacitance at the input of the power adaptor, (ii) drawing a sinusoidal current waveform from the input that is substantially in phase with the sinusoidal voltage waveform at the input, and (iii) drawing current that is proportional to the voltage, such that the current falls as the voltage falls. These features reduce current distortion and harmonic currents drawn from the mains supply, and increase the efficiency and power factor of the power adaptor by removing the capacitive load presented to the mains supply. Indeed, these features enable the power adaptor and connected solid state light source to be presented to the mains supply as a conventional lamp.

The solid state light source is preferably a Light Emitting Diode (LED), or a series of two or more LEDs. Since the potential difference across an LED, or a series of two or more LEDs, is substantially constant, the power adaptor preferably controls the current drawn from the input in order to maintain the average power drawn from the input substantially constant at a pre-determined value. The pre-determined average power is preferably determined at least partially by a reference signal, which may include a control signal provided by the controller.

The power adaptor is preferably adapted to draw a current from the input that is substantially proportional to the voltage at the input. In particular, the power transfer module is preferably adapted to draw a sinusoidal current waveform from the input that is substantially in phase with the sinusoidal voltage waveform at the input, and the power transfer module and/or the controller preferably includes a multiplier that determines the proportional relationship between the current and the voltage that would result in a pre-determined average power being drawn from the input. The power transfer module and/or the controller are preferably adapted to sense the voltage waveform at the input of the power adaptor, and determine the required current to be drawn from the input based on that voltage waveform. The power adaptor preferably includes a voltage monitor that provides a reduced amplitude representation of the voltage at the input of the power adaptor.

The power transfer module includes an LCL series-parallel resonant circuit, which is may be adapted to draw a sinusoidal current waveform from the input that is substantially in phase with the sinusoidal voltage waveform at the input. In this case, the controller of the power adaptor preferably determines the proportional relationship between the current and the voltage that would result in a pre-determined average power being drawn from the input, and hence acts as the multiplier discussed above.

The power transfer module preferably includes a transformer and one or more diodes at its output from which the output power signal is delivered to the light source. The transformer isolates the light source from the mains supply, and the one or more diodes ensure that no reverse currents are present that could damage the light source.

The control circuitry of the controller may be powered by an integrated power supply.

Where the control circuitry of the controller is powered by an integrated power supply, this power supply preferably draws power directly from the mains power supply, most preferably via the input of the power adaptor. In particular, the power supply is preferably a constant current power supply, such as a switch mode constant current regulator, which preferably does not cause excessive inrush and is low in cost. The control circuitry is preferably adapted to shut itself down during the off periods of a mains cycle, for example when the power adaptor is connected to a TRIAC or similar device, so that the constant current device can be low in power and hence the efficiency high.

The power transfer module preferably also includes a fault detection circuit that disables that module in the event that the load is removed, which may be caused by failure or disconnection of the light source, for example. The fault detection circuit preferably includes an opto-isolator in order to maintain isolation of the light source from the mains supply. This fault detection circuit is a feedback circuit, but it preferably draws no power from the output of the power transfer module during normal operation, and hence should not be confused with an active feedback circuit that regulates the power output. The fault detection circuit would be active during a fault condition only, and is not essential for controlling the output power during normal use.

The power adaptor preferably includes a fault detection circuit that disables the power transfer module in the event that the load is removed, which may be caused by failure or disconnection of the light source, for example. The fault detection circuit preferably includes an opto-isolator in order to maintain isolation of the light source from the mains supply. This fault detection circuit is a feedback circuit, but it preferably draws no power from the output of the power transfer module during normal operation, and hence should not be confused with an active feedback circuit that regulates the power output. The fault detection circuit would be active during a fault condition only, and is not essential for controlling the output power during normal use.

The controller is preferably adapted to provide a control signal that varies the reference signal provided to the power transfer module, and hence varies the pre-determined average power drawn from the input. Where the power adaptor includes a plurality of power transfer modules, the controller is preferably able to independently vary the reference signals provided to those power transfer modules. This feature enables the intensity of light emitted by particular LEDs and/or series of LEDs to be independently varied. In particular, the controller is preferably adapted to receive commands from a user interface, which may take the form of a power reducing device in series with the power adaptor, serial data via a hard wired or wireless controller, or controls provided on the power adaptor itself. The controller is preferably programmed with one or more lighting profiles that determine the manner in which the reference signals provided to the power transfer modules are varied in response to commands from a user interface. The controller preferably varies the reference signal by outputting a control signal, which preferably offsets the reference signal by a DC voltage.

Any variation of the reference signal provided to the power transfer module that is effected by a control signal of the controller is preferably made at zero crossing points of the input power signal, or alternatively at a frequency less than the frequency of the input power signal, so that the current drawn by the power adaptor remains substantially a sine wave in phase with the voltage at the input, and current harmonic distortion is minimised. A further possibility is to apply a distortion, preferably a DC level adjusted saw tooth waveform, with an amplitude that is sufficiently low that it does not cause distortion of the current drawn from the input that is greater than allowed by the relevant harmonic standard. This saw tooth waveform takes advantage of the squared power law to provide precise current control at low levels as described in WO 2007/026170. The saw tooth waveform is preferably allowed to reduce in amplitude as the DC level moves towards controlling higher powers to minimise the harmonic distortion of a particular channel.

Since each power transfer module is not a power regulator, if a power reducing device reduces the power available to the input of the power adaptor, the output power will reduce in proportion. Each power transfer module would normally draw a reduced average power from the input, and hence provide a reduced average power at the output, as the power available from the input of the power adaptor reduces. However, each power transfer module may be designed to maintain the current drawn from the input at an increased value than is required for maximum light output of the associated LED, when a maximum amount of power is available from the input of the power adaptor, which is then in turn reduced by the controller to provide only the power required for maximum output and no more. As the external power reducing device lowers the available input power, the controller may then vary the reference signal provided to each power transfer module so that the current drawn from the input is increased, and the average power of the output therefore stays equal to the power required by the LED for maximum brightness. This allows the LED to have a maximum brightness, even when the power available from the input of the power adaptor has been reduced until the power available from the input of the power adaptor would normally equal the power required by the LED for maximum brightness. Any reduction in the power available to the power transfer module below this threshold will necessarily result in a dimming of the LED.

The controller is preferably adapted to detect the average voltage, eg the rms voltage, of the mains supply, and select an appropriate proportional relationship between the current being drawn at the input of the power adaptor and the voltage at the input of the power adaptor, in order to maintain the same pre-determined average power for two or more different average voltages of the mains supply. Where the power transfer module and/or the controller includes a multiplier that determines the proportional relationship between the current and the voltage that would result in a pre-determined average power, the controller preferably provides a reference signal to the multiplier that is dependent upon the average voltage of the mains supply. Most preferably, the controller is adapted to detect whether the mains supply has an rms voltage of approximately 110V or an rms voltage of approximately 230V, and supply an appropriate reference signal to the multiplier. In particular, the reference signal for the 110V rms voltage may be approximately 200% of the reference signal for the 230V rms voltage.

Conventionally, the current supplied to an LED must be limited by a resistor in series with the LED, in order to prevent damage to the LED. However, since the power adaptor according to the invention may be adapted to provide a pre-determined average power to the LED, and the potential difference of the LED is substantially constant, the current will be regulated without any need for a series resistor or current sense regulation at the output.

The power adaptor may include a filter at its input for reducing harmonic currents drawn from the mains supply. The filter may comprise a small non-electrolytic capacitor-inductor network. The power adaptor preferably also includes a rectifier at its input that converts the input waveform to one of constant polarity. Most preferably, the rectifier is a full wave rectifier that reverses the negative (or positive) portions of the alternating current waveform. Nevertheless, there is no need for the power adaptor to provide a steady DC signal at the input of the power transfer module, and hence a bulk storage capacitor (also known as a reservoir capacitor or smoothing capacitor) is preferably not provided between the input of the power adaptor and the power transfer module. Indeed, the power adaptor is preferably substantially free of electrolytic capacitors. This enables the supply to be designed with minimal reactance, minimal inrush current, and long life with reduced size and cost relative to prior art power adaptors for solid state lighting systems. A bulk storage capacitor may be provided at the output of the power transfer module, but this is not essential for the functioning of the power adaptor with a conventional solid state light source.

The power adaptor according to the invention is suitable for use in a lighting system that utilises any power reducing device for determining the power available at the input of the power adaptor. In particular, the power reducing device may be a variable resistor, such as a Variac, or a rheostat. The power adaptor is also able to function in lighting systems that include a dimmer control utilising SCR phase control in order to reduce the power available at the input of the power adaptor. In this case, however, the power transfer module may be adapted to draw a minimum current from the mains supply to keep the SCR stable during the full mains cycle, unless the lighting unit is switched off, to ensure the continued functioning of the dimmer control.

In presently preferred embodiments, the power transfer module is adapted to draw power immediately, once a voltage is present at the input of the power adaptor, such that the power transfer module enables sufficiently continuous and smooth conduction to maintain a TRIAC device fired during the remainder of a mains cycle. Any integrated circuit of the power transfer module is preferably therefore maintained in a standby mode when no voltage is present at the input of the power adaptor, for example when a TRIAC device causes an off period of the mains cycle, and is adapted to draw power immediately and continuously once a voltage is present. Most preferably, the controller is adapted to detect whether a voltage is present at the input of the power adaptor, and send a control signal to the integrated circuit of the power transfer module to switch that integrated circuit to a standby mode when no voltage is detected at the input, and to an operational mode when a voltage is detected at the input. By "standby mode" is meant that the integrated circuit is supplied with sufficient power to be operational, but the power transfer module does not draw sufficient power from the mains supply to drive the solid state light source. By "operational mode" is meant that the power transfer module draws sufficient power from the mains supply to drive the solid state light source.

Hence, where a power reducing device is adapted to cause the voltage at the input of the power adaptor to be switched on and off at least once each cycle, for example using a triode alternating diode switch (TRIAC), the controller is preferably adapted to switch the integrated circuit of the power transfer module to a standby mode whenever no voltage is detected at the input, and to an operational mode whenever a voltage is detected at the input. The integrated circuit of the power transfer module may therefore be switched between standby and operational modes many times each second, for example 100 times each second for a 50 Hz mains supply. This arrangement maintains high efficiency at low cost at all TRIAC firing times from the mains supply.

Where the power adaptor is adapted to drive a plurality of solid state light sources, and hence comprises a plurality of output channels, the controller is preferably able to independently switch the integrated circuits of the plurality of power transfer modules to a standby mode. In particular, the controller is preferably adapted to inactivate a solid state light source by switching the integrated circuit of the associated power transfer module to a standby mode.

The power adaptor may therefore comprise an output for a high efficiency light source, such as a white light source, as well as one or more sources of lower efficiency, such as coloured light sources. In this embodiment, the power adaptor may be adapted to switch the one or more lower efficiency outputs (eg coloured light sources) to a standby mode, whilst providing power to the high efficiency output (eg white light source), at a pre-determined power level, such as a maximum power level. The arrangement would result in very high efficiency at the maximum power level.

This arrangement also enables a lighting system in which the light unit provides white light at a maximum power level, and the coloured light effects, such as a warmer white light, at lower power levels. In particular, the high efficiency light source is preferably a high colour temperature white light source, and the one or more lower efficiency light sources preferably includes a coloured light source, such as an amber light source, for mixing with the white light source to create a more desirable, eg warmer, "white" light. This arrangement may therefore encourage lower power levels to be utilised, which may therefore save energy without any loss of efficiency at a maximum power level.

Where the control circuitry of the power adaptor is supplied by an integrated constant current power supply, this power supply preferably includes a shut-off feature, such that unnecessary power is not supplied whilst the lower efficiency outputs are inactive.

According to a further aspect of the invention, there is provided a lighting system comprising a power adaptor as described above and a lighting unit including at least one solid state light source.

The lighting unit will typically be provided with a plurality of solid state light sources. In order to achieve different colours of light output, the lighting unit preferably includes solid state light sources that emit light of different colours, and most preferably LEDs that emit light of red, green and blue colour. Furthermore, the lighting unit may also include LEDs of amber, cyan and white colour in order to raise the colour rendering index.

The power adaptor and the lighting unit may have a common housing, or may be housed separately. Indeed, the power adaptor may be adapted to provide power to a plurality of lighting units, each lighting unit including a plurality of solid state light sources. Furthermore, the lighting system may include a plurality of such power adaptors. The lighting system may also include a power reducing device, such as a variable resistor, a rheostat or a dimmer control that utilises SCR phase control.

A preferred embodiments of the invention will now be described in greater detail, by way of illustration only, with reference to the accompanying drawings, in which FIG. 1 is a schematic diagram of a lighting system;

Figure 1:
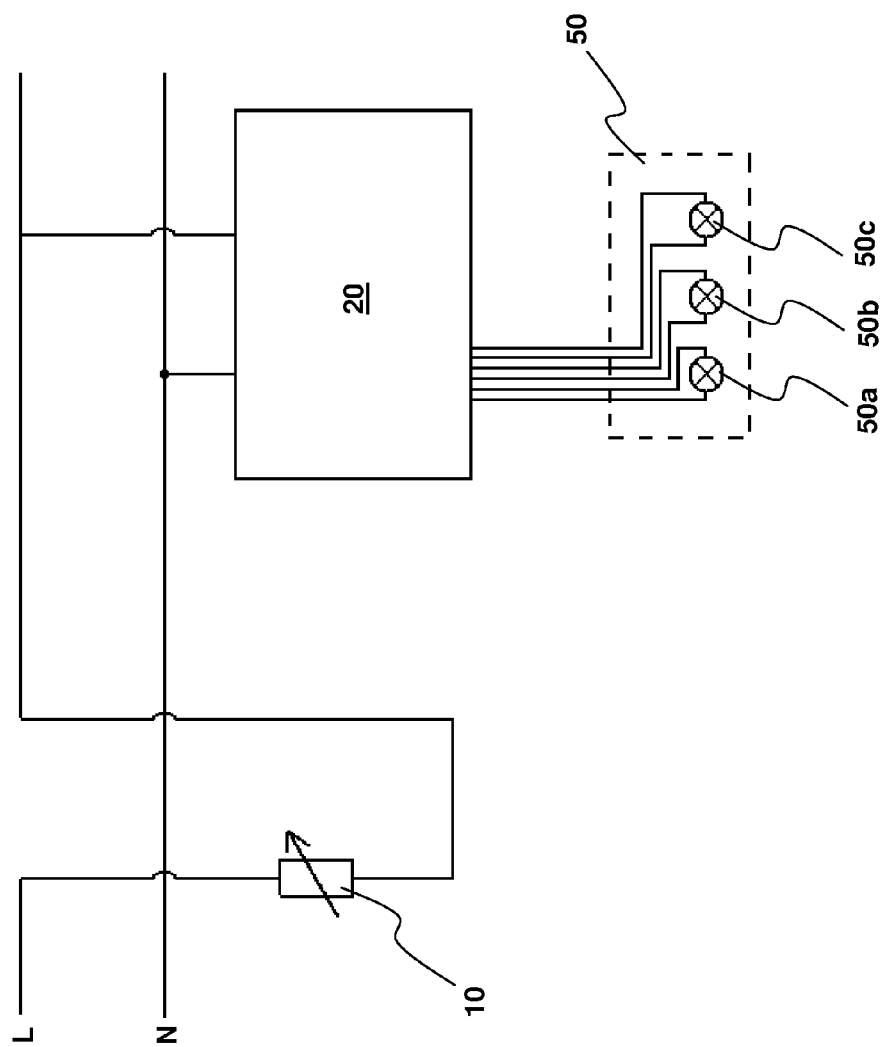

FIG. 1 shows a lighting system connected to a mains circuit including a mains supply L,N and a power reducing device 10, such as a rheostat, and comprises a power adaptor 20 and a solid state lighting unit 50. The solid state lighting unit 50 comprises three coloured emitters 50a, 50b, 50c in a colour array, one each of red, green and blue LEDs. The power adaptor 20 is supplied with electrical power from the mains circuit, and is adapted to control the electrical power supplied to the solid state lighting unit 50. The power adaptor 20 and solid state lighting unit 50 may be enclosed within separate housings, or within a common housing of a type as described in WO 2006/018604.

Figure 2:
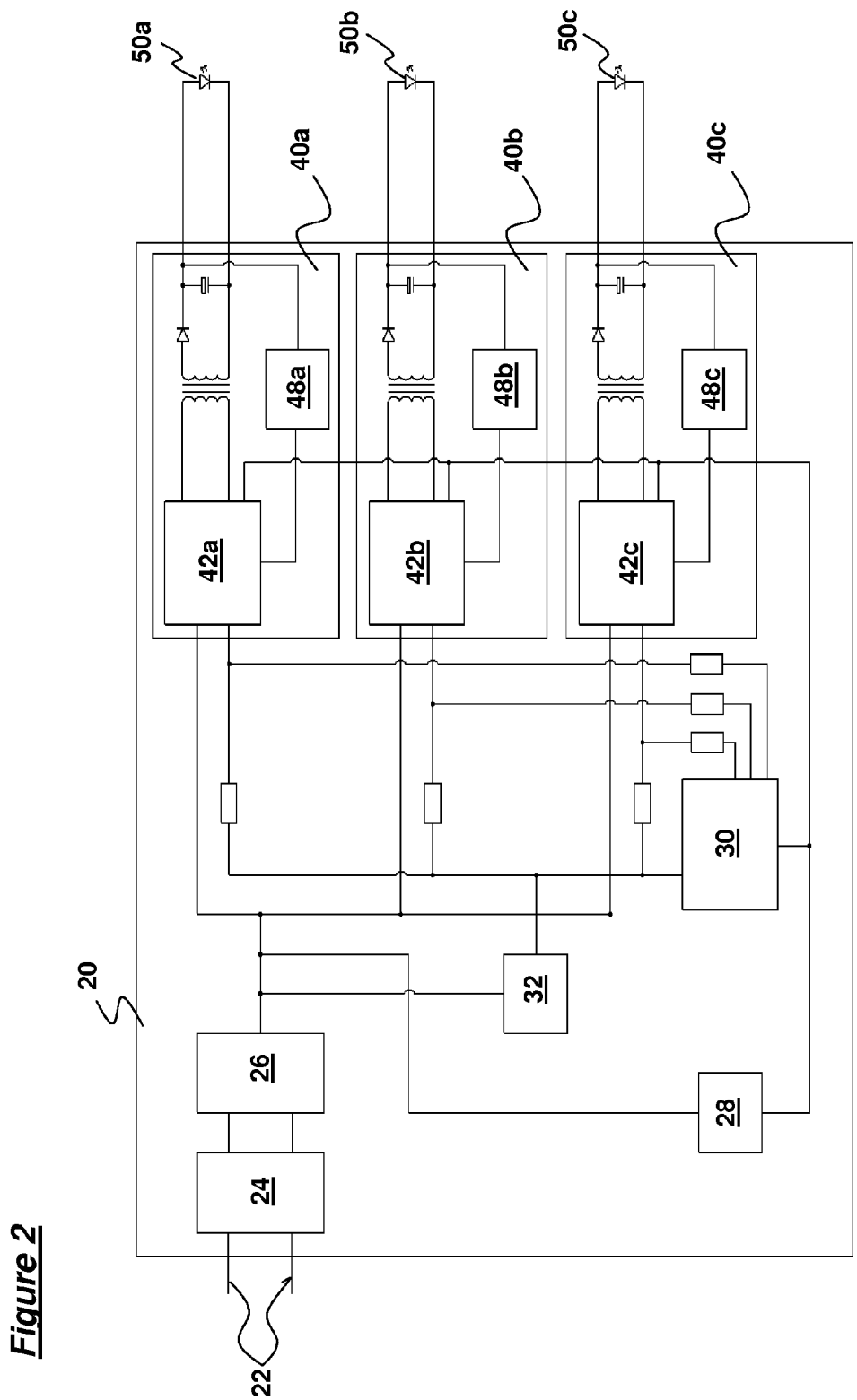
FIG. 2 is a schematic diagram of a power adaptor that forms part of the lighting system of FIG. 1.

Referring now to FIG. 2, the power adaptor 20 comprises an input 22 for drawing electrical power from the mains circuit, and three power transfer modules 40a,40b,40c for providing electrical power to each of the three LEDs 50a,50b, 50c in the solid state lighting unit 30. Each power transfer module 40a,40b,40c is connected to the input 22 via a filter 24 and a rectifier 26, so that a sinusoidal voltage waveform drawn from the mains circuit is supplied to each power transfer module 40a,40b,40c as a full-wave rectified waveform.

A voltage monitoring circuit 32 is connected to the input 32 via the filter 24 and rectifier 26, and acts to monitor the average power available at the input 22. The voltage monitoring circuit 32 is simply a potential divider that provides a reduced amplitude representation of the signal drawn through the filter 24 and rectifier 26.

The power adaptor 20 is also provided with a controller 30, which includes a Programmable Interface Chip (PIC). The controller 30 has an input that receives a signal from the voltage monitoring circuit 32, and three outputs for supplying separate control signals to each of the power transfer modules 40a,40b,40c via a corresponding series resistor. Each control signal is calculated using the signal received from the voltage monitoring circuit 32, and hence the average power available at the input 22 of the power adaptor 10. The control signal(s) determine the power supplied by the power transfer modules 40a,40b,40c to the LEDs 50a,50b,50c, and hence determine the colour and/or intensity of the light emitted by the solid state lighting unit 30.

Each power transfer module 40a,40b,40c comprises a power factor correction circuit 42a,42b,42c including integrated circuit L6562 operating in power transition mode, which is manufactured by ST Microelectronics of 39 Chemin du Champ des Filles, C. P. 21, CH 1228 Plan-Les-Ouates, Geneva, Switzerland. The power factor correction circuit 42a,42b,42c is adapted to draw a current that is substantially in phase with the voltage of the input power signal, and provide an output power signal of constant average power with a current substantially in phase with the voltage. The power factor correction circuit 42a,42b,42c therefore includes a multiplier that determines the current to be drawn, for a given input voltage, in order to maintain a constant average power output with the current and voltage waveforms substantially in phase with each other. The power factor correction circuit 42a,42b,42c also acts to reduce the harmonic distortion of the current drawn from the mains supply.

The power factor correction circuits 42a,42b,42c differ from a standard power factor correction circuit in that there is no need for a feedback loop from the output to the integrated circuit. The efficiencies of the power factor correction circuits 42a,42b,42c are therefore increased relative to a conventional power factor correction circuit.

The power factor correction circuits 42a,42b,42c determine the current to be drawn at the input using the difference between the voltage of the electrical power supply and a reference voltage provided to a pin of the integrated circuit L6561. In order to vary the power output of the power adaptor 20, the controller 30 is therefore adapted to control the reference voltage provided to the power factor correction circuit 42a,42b,42c.

In particular, the controller 30 is adapted to output a control signal that is a function of the power presently available at the input 22 and a lighting profile stored in a memory of the controller 30. The memory stores a series of lighting profiles, one of which is selected by the controller as a function of a power historically available at the input 22. This enables a user to select a particular lighting profile by operating the power reduction device in a particular manner, as described in WO 2006/018604.

The reference voltage of each power transfer module 40a, 40b,40c is equal to the signal from the voltage monitor 32, which is supplied via corresponding series resistors, off-set by a control signal supplied by the controller 30, which is supplied via corresponding series resistors.

The controller 30 is therefore able to vary the reference voltage of the power factor correction circuit 42a,42b,42c, and hence vary the current drawn from the mains circuit, by varying the control signal that is sent to each power transfer module 40a,40b,40c.

Each power transfer module 40a,40b,40c would normally reduce the power supplied to the associated LED 30a,30b,30c as the power available at its input reduces, and hence the power available from the mains circuit reduces. However, each power transfer module 40a,40b,40c is configured to attempt to provide greater power to the LED 50a,50b,50c than is required for maximum light output, when the power reducing device 10 enables maximum power to be drawn from the mains circuit, and the controller 30 is configured to decrease the power drawn from the input 22 by the power transfer module 40a,40b,40c, so that the output of the power transfer module 40*a*,40*b*,40*c* is in fact equal to the power required by the LED 50*a*,50*b*,50*c* for maximum brightness.

Where a lighting profile requires an LED 50*a*,50*b*,50*c* to have a maximum brightness, even when the power reducing device 10 has reduced the power available from the mains circuit, the controller 30 outputs a control signal that increases the power drawn by the power transfer module 40*a*,40*b*,40*c*, so that the output of the power transfer module 40*a*,40*b*,40*c* remains equal to the power required by the LED 50*a*,50*b*,50*c* for maximum brightness. In this way, the controller 30 is able to maintain the LED 50*a*,50*b*,50*c* at maximum brightness until the power available from the mains circuit equals the power required by the 50*a*,50*b*,50*c* for maximum brightness. Any reduction in the power available to the power transfer module 40*a*,40*b*,40*c* below this threshold will result in a dimming of the LED 50*a*,50*b*,50*c*.

The controller 30 is adapted to detect the rms voltage of the mains supply, and select an appropriate proportional relationship between the current being drawn at the input (22) of the power adaptor (20) and the voltage at the input (22) of the power adaptor (20), in order to maintain the same pre-determined average power for two different rms voltages. In particular, the controller (30) is adapted to detect whether the mains supply has an rms voltage of approximately 110V or an rms voltage of approximately 230V, and supply an appropriate reference signal to the multipliers of the power factor correction circuits 42*a*,42*b*,42*c*. In particular, the reference signal for the 110V rms voltage is approximately 200% of the reference signal for the 230V rms voltage.

The output of each of the power factor correction circuits 42*a*,42*b*,42*c* passes though a transformer that isolates the LED 50*a*,50*b*,50*c* from the mains circuit, and a diode that ensures that no negative current flows through the LED 50*a*, 50*b*,50*c*. A bulk storage capacitor is shown in parallel with the LED 50*a*,50*b*,50*c*, which reduces the variation in the voltage being supplied to the LED 50*a*,50*b*,50*c*. However, this bulk storage capacitor is not a necessary part of the power adaptor 20 and is only used to lower the peak currents and ripple, and hence allow a higher efficiency through the LED as it approaches DC.

The controller 30 determines the average power delivered by each power transfer module 40*a*,40*b*,40*c* to its corresponding LED 50*a*,50*b*,50*c*. The potential difference across the LED 50*a*,50*b*,50*c* will be regulated by the characteristics of the LED 50*a*,50*b*,50*c* to a particular average value, and the average current will be that determined by the power transfer module 40*a*,40*b*,40*c* to be necessary in order to deliver the required power to the LED 50*a*,50*b*,50*c*. In particular, each LED 50*a*,50*b*,50*c* will have a particular forward potential difference, which may fall anywhere within a tolerance range due to temperature or manufacturing variations. Each LED 50*a*,50*b*,50*c* will therefore regulate the voltage of the output from the associated power transfer module 40*a*,40*b*,40*c* to its particular forward potential difference. Each power transfer module 40*a*,40*b*,40*c* will provide an average current to the connected LED 50*a*,50*b*,50*c* that is determined to be required to achieve the desired power, set by the controller.

Any changes to the reference voltage of the power transfer modules 40*a*,40*b*,40*c* that are effected by the control signals of the controller 30 are made at zero crossing points of the power drawn from the mains circuit, or alternatively at a frequency less than the mains frequency, so that the current drawn by the power adaptor 20 remains substantially in phase with the voltage of the mains circuit, and current harmonic distortion is minimised. Alternatively, a DC level adjusted saw tooth waveform is utilised, which has an amplitude that is sufficiently low that it does not cause distortion of the current drawn from the input 22 that is greater than allowed by the relevant harmonic standard. This saw tooth waveform takes advantage of the squared power law to provide precise current control at low levels as described in WO 2007/026170.

A DC power supply 28 is connected to the input 22 of the power adapter 20 via the filter 24 and rectifier 26, and is arranged to provide power to each power transfer module 40*a*,40*b*,40*c*, as well as the controller 30. This provides a stable power supply to the integrated circuits of the controller 30 and the power factor correction circuits 42*a*,42*b*,42*c* to ensure stable functioning of those circuits.

The controller 30 is adapted to detect whether a voltage is present at the input 22 of the power adaptor, and send a control signal to the integrated circuits of the power factor correction circuits 42*a*,42*b*,42*c* to switch those integrated circuits to a standby mode when no voltage is detected at the input, and to an operational mode when a voltage is detected at the input. Each of the power factor correction circuits 42*a*,42*b*,42*c* is therefore adapted to draw power immediately, once a voltage is present at the input of the power adaptor.

Each power transfer module 40*a*,40*b*,40*c* preferably also includes a fault detection circuit 50*a*,50*b*,50*c* that is connected between the output of the transformer and diode arrangement, and a disable pin on the integrated circuit of the power factor correction circuit 42*a*,42*b*,42*c*. The fault detection circuit 48*a*,48*b*,48*c* does not draw any power during normal operating conditions. However, in the event that an LED 50*a*,50*b*,50*c* stops conducting, the associated fault detection circuit 50*a*,50*b*,50*c* causes that power transfer module 40*a*,40*b*,40*c* to shut-off. The fault detection circuit 48*a*, 48*b*,48*c* includes an opto-isolator, so that the LEDs 50*a*,50*b*, 50*c* are isolated from the mains circuit.

Figure 3:
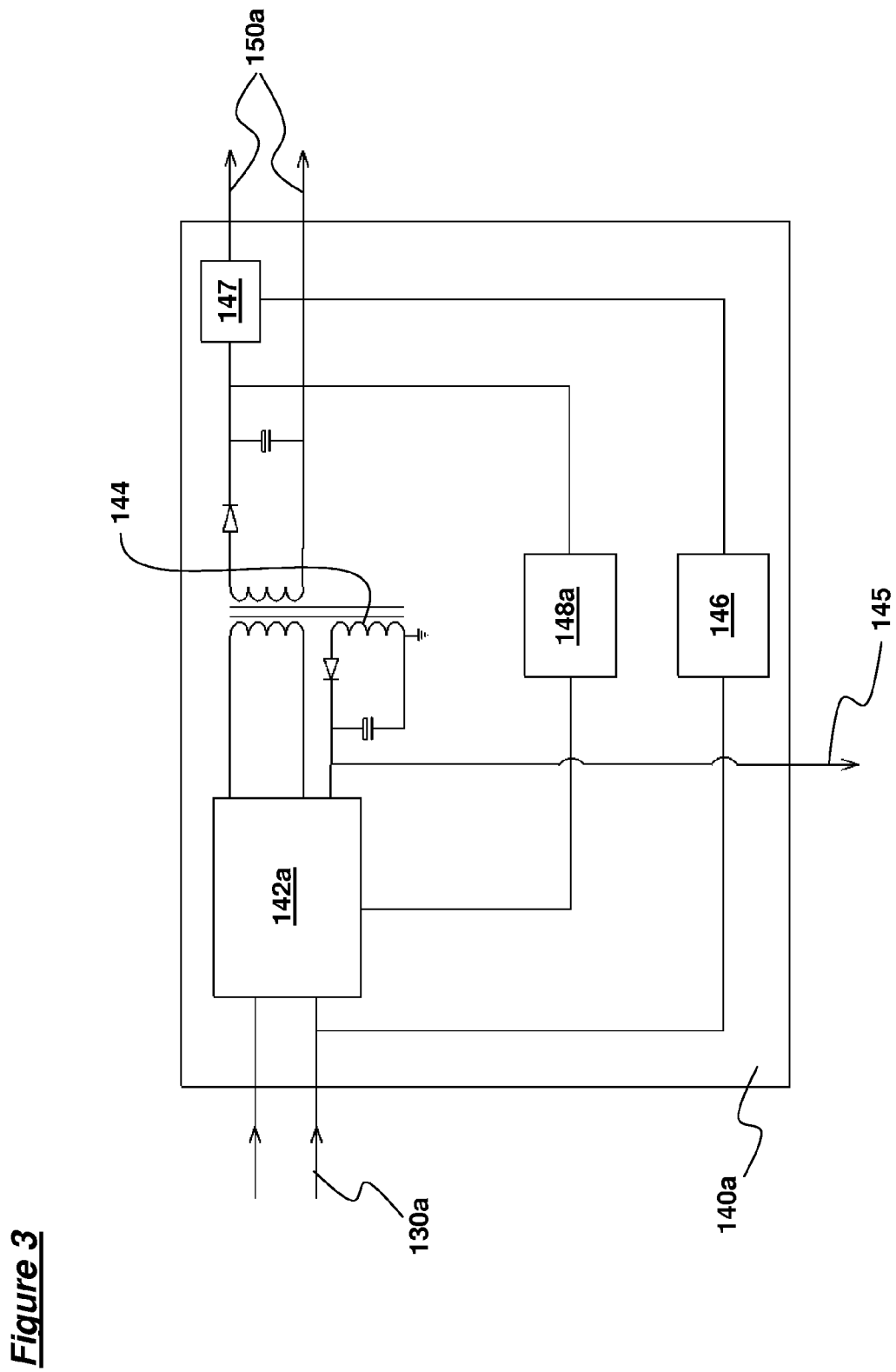
FIG. 3 is a schematic diagram of a an alternative power transfer module for the power adaptor of FIG. 2.

FIG. 3 shows a an alternative power transfer module for the power adaptor of FIG. 2, which is generally designated 140*a*. The associated lighting system is identical to that of FIGS. 1 and 2, save for a modification of one of the power transfer modules 140*a* in order to remove the need for the low voltage DC power supply 28 of the first embodiment, which provides power to each power transfer module 40*a*,40*b*,40*c*, as well as the controller 30, in that embodiment. The modified power transfer module 140*a* therefore includes a power factor correction circuit 142*a* and a fault detection circuit 148*a*, in a similar arrangement to the corresponding power transfer module 40*a* described in relation to FIGS. 1 and 2.

The modified power transfer module 140*a* differs from the corresponding power transfer module 40*a* of the first embodiment in that the transformer includes an auxiliary winding 144 that supplies power, via a rectifying diode and a bulk capacitor, to the power factor correction circuit 142*a* of the modified power transfer module 140*a*, as well as the power factor correction circuits 42*b*,42*c* of the other power transfer modules 40*b*,40*c* and the controller 30, along path 245.

In this arrangement, if the output of the power factor correction circuit 142*a* of the modified power transfer module 140*a* is reduced to zero, in order to fully dim the LED connected to output path 150*a*, the power available from the auxiliary winding 144 to power the power factor correction circuits 142*a*,42*b*,42*c* and the controller 30 will also reduce to zero. For this reason, the modified power transfer module 140*a* includes a variable resistance circuit 147 that enables the LED connected to output path 150*a* to be fully dimmed, whilst maintaining sufficient power at the auxiliary winding 144 to power the power factor correction circuits 142*a*,42*b*, 42*c* and the controller 30. In particular, the variable resistance circuit 147 is adapted to have an increased resistance as the power supplied by the power factor correction circuit 142*a* to the associated LED is reduced, such that the LED is fully dimmed even when there remains sufficient power at the output of the power transfer module 142a to power the power factor correction circuits 142a,42b,42c and the controller 30. The variable resistance circuit 147 is also adapted to have a negligible resistance when the power supplied to the LED is increased to a medium to high power. This arrangement therefore does not affect the efficiency of the power adaptor at medium to high powers, where efficiency is important, and this arrangement also removes the need for an additional power supply.

The variable resistance circuit 147 is provided with a control signal that is derived from the control signal supplied by the controller 30 to the power factor correction circuit 142a, along input path 130a, in order to control the resistance of the variable resistance circuit 147, in the manner described above. The path of the control signal for the variable resistance circuit 147 includes an opto-isolator 146, so that the associated LED 50a is isolated from the mains circuit.

Only one modified power transfer module 140a is required in order to power the three power factor correction circuits 142a,42b,42c and the controller 30 of the power adaptor, and hence the other two power transfer modules 40b,40c are identical to those of the first embodiment. The controller 30 of the second embodiment is adapted to take into account the increased power required by modified the power transfer module 140a, when the associated LED 50a is fully dimmed, in order to maintain power supply to the power factor correction circuits 142a,42b,42c and the controller 30 of the power adaptor.

Figure 4:
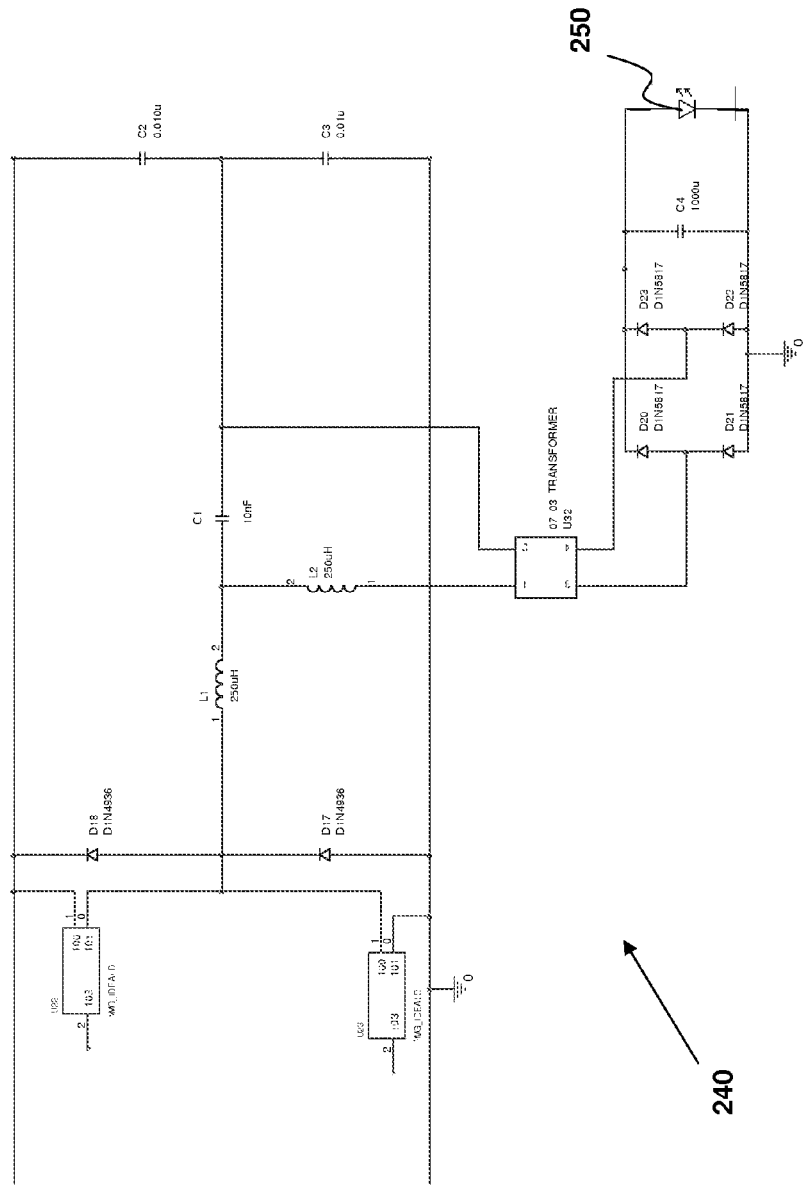
FIG. 4 is a schematic diagram a power transfer module that forms part of a power adaptor and a lighting system according to the invention.

FIG. 4 shows part of a power adaptor and lighting system according to the invention, and in particular shows a power transfer module 240 for use in place of each of the power transfer modules 40a,40b,40c of the lighting system of FIGS. 1 and 2. This power transfer module 240 uses LCL technology in place of the power factor correction circuit 42a,42b, 42c, including integrated circuit L6562, of the lighting system of FIGS. 1 and 2. In particular, the power transfer module 240 comprises a resonant power supply utilising an LCL series-parallel resonant circuit that has the unique feature that at the resonant frequency, XS=XP=XL, where XS=reactance of the series inductance, XP=reactance of the capacitance in parallel with the transformer, and XL is the reactance of the leg containing the transformer and load. Under these special conditions, the circuit is ideal for driving a constant power load, such as an LED 250. The value of the power to the LED 250 can be varied with the variation of the input supply voltage, which makes it suitable for use with a power reducing device 10.

The power delivered to the LED 250 can be further modulated by variation of the duty ratio of the switches of the resonant power supply within each half resonant cycle, possible using the controller 30. The normal characteristic of the LCL circuit is to draw a power which is directly related to input voltage. As the voltage at the input 22 varies sinusoidally, the AC current drawn from the input 22 follows a square shape. However, it is possible to use the on-time modulation of the switches to reduce the power drawn from the input 22 as the AC voltage decreases to each zero crossing and therefore to improve the input current harmonics. With this control, the power drawn from the AC supply has a $\sin^2$ waveform because both the current and the voltage are sinusoidal. The addition of a capacitor on the output of the rectifier can smooth the power delivered to the LED such that the light output will contain less fluctuation.

With a profiled control of switching times, the current drawn from the input 22 can be controlled to any desired shape and magnitude to match the required lighting characteristics. The circuit may have open loop control profiling with an AC input voltage wave in order to achieve the best harmonic input current content, as well as superimposing the required lighting characteristic on the harmonic control strategy as the power reducing device is varied.

The invention claimed is:

1. A power adaptor for a lighting unit having a solid state light source, the power adaptor comprising:
    an input for connection to a mains power supply,
    a power transfer module that is coupled to the input and provides an output suitable for driving the solid state light source, and
    a controller able to deliver a control signal to the power transfer module,
    wherein the power transfer module further comprises an LCL series-parallel resonant circuit, and
    wherein the power adaptor draws current from the input as a function of the voltage at the input,
    such that the intensity of light output from the solid state light source is controllable by an external power reducing device.

2. A power adaptor as claimed in claim 1, wherein the power adaptor is substantially free of bulk storage capacitance between the input of the power adaptor and the power transfer module.

3. A power adaptor as claimed in claim 1, wherein the power adaptor draws current from the input as a function of voltage at the input in order that the power adaptor appears as a resistive load to the mains supply.

4. A power adaptor as claimed in claim 3, wherein the controller is able to deliver a control signal to the power transfer module, such that the power adaptor appears as a variable resistor to the mains supply.

5. A power adaptor as claimed in claim 4, wherein the controller is able to deliver a control signal to the power transfer module for reducing the power drawn from the input.

6. A power adaptor as claimed in claim 1, wherein the controller is able to deliver a control signal to the power transfer module for reducing the power drawn from the input, such that the intensity of light output from the solid state light source can be controlled by a combination of an external power reducing device and the controller.

7. A power adaptor as claimed in claim 6, wherein the controller is adapted to cause a reduction of the power drawn from the input of the power adaptor when a maximum amount of power is available, and then lessen that reduction as the amount of power available falls, thereby causing the solid state light source to follow a non-linear dimming curve.

8. A power adaptor as claimed in claim 1, wherein the solid state light source is provided with a predetermined average power.

9. A power adaptor as claimed in claim 8, wherein the predetermined average power provided to the solid state light source is substantially equal to the average power drawn at the input of the power adaptor.

10. A power adaptor as claimed in claim 9, wherein the intensity of the light output from the solid state light source inherently reduces as the power drawn from the input reduces, and hence the power adaptor does not regulate a constant output to the solid state light source.

11. A power adaptor as claimed in claim 1, wherein the power transfer module is adapted to maintain the current drawn from the input at an increased value than is required for maximum light output of the associated solid state light source, when a maximum amount of power is available from the input of the power adaptor, which is then in turn reduced by the controller to provide only the power required for maximum output and no more.

12. A power adaptor as claimed in claim 11, wherein the controller is adapted to vary the reference signal provided to the power transfer module, as an external power reducing device lowers the available input power, so that the average power of the output stays equal to the power required by the solid state light source for maximum brightness, until the power available from the input of the power adaptor is reduced below a threshold at which it equals the power required by the solid state light source for maximum brightness, which necessarily results in a dimming of the solid state light source.

13. A lighting system comprising a power adaptor as defined in claim 1 and a lighting unit including at least one solid state light source.

14. A lighting system as claimed in claim 13, wherein the lighting system includes a power reducing device.

* * * * *